US011015995B2

United States Patent
Parsons

(10) Patent No.: US 11,015,995 B2
(45) Date of Patent: May 25, 2021

(54) IN-SITU PRESSURE SENSOR BIAS DETERMINATION APPARATUS, SUBSEA SENSOR NODE APPARATUS AND METHOD OF DETERMINING A BIAS OF A PRESSURE SENSING APPARATUS

(71) Applicant: SONARDYNE INTERNATIONAL LIMITED, Yateley (GB)

(72) Inventor: Adrian Bryan Parsons, Surrey (GB)

(73) Assignee: SONARDYNE INTERNATIONAL LIMITED, Hampshire (GB)

( * ) Notice: Subject to any disclaimer, the term of this patent is extended or adjusted under 35 U.S.C. 154(b) by 149 days.

(21) Appl. No.: 15/775,558

(22) PCT Filed: Nov. 10, 2016

(86) PCT No.: PCT/GB2016/053508
§ 371 (c)(1),
(2) Date: May 11, 2018

(87) PCT Pub. No.: WO2017/081463
PCT Pub. Date: May 18, 2017

(65) Prior Publication Data
US 2018/0348078 A1 Dec. 6, 2018

(30) Foreign Application Priority Data

Nov. 13, 2015 (GB) ...................... 1520075

(51) Int. Cl.
*G01L 27/00* (2006.01)
*G01C 13/00* (2006.01)
*G01L 19/00* (2006.01)

(52) U.S. Cl.
CPC ............ *G01L 27/005* (2013.01); *G01C 13/00* (2013.01); *G01L 19/00* (2013.01)

(58) Field of Classification Search
CPC ....... G01L 19/00; G01L 27/005; G01C 13/00; G01C 13/008
See application file for complete search history.

(56) References Cited

U.S. PATENT DOCUMENTS 3,777,546 A * 12/1973 Rollins ................. G01L 27/005
73/1.57
4,102,175 A * 7/1978 Foster ................... G01L 27/005
376/247

(Continued)

FOREIGN PATENT DOCUMENTS

DE          10018493 C1    10/2001
WO     WO-2013/110255 A1    8/2013

OTHER PUBLICATIONS

Solinist Technical Bulletin: "Understanding Pressure Sensor Accuracy, Precision, Resolution, and Drift" downloaded Aug. 12, 2020.*

(Continued)

*Primary Examiner* — Natalie Huls
(74) *Attorney, Agent, or Firm* — Harness, Dickey & Pierce, P.L.C.

(57) ABSTRACT

An in-situ pressure sensor bias determination apparatus (300) comprises a measurement pressure sensor (400), a reference pressure sensor (402), an electronically controllable pressure adjustment device (406), and a fluid conduit network (410) having an ambient access port (412). The measurement pressure sensor (400) has a greater operating pressure range than the reference pressure sensor (402). The measurement pressure sensor (400), the reference pressure sensor (402) and the pressure adjustment device (406) are sealingly coupled to the fluid conduit network (410) so as to define a volume that is open only at the ambient access port (412). An ambient isolation device (420) is arranged to isolate selectively the ambient access port (412) from the measurement pressure sensor (400), the reference pressure (Continued)

sensor (402) and the pressure adjustment device (406), thereby closing the open volume.

19 Claims, 5 Drawing Sheets

(56) References Cited

U.S. PATENT DOCUMENTS

| | | | | |
|---|---|---|---|---|
| 5,672,808 | A * | 9/1997 | Klauder | G01L 9/0019 73/1.59 |
| 10,161,822 | B1 * | 12/2018 | Rollins | G01L 13/025 |
| 2003/0177812 | A1 * | 9/2003 | Joseph | G01L 27/005 73/1.71 |
| 2013/0213505 | A1 * | 8/2013 | Gnessin | F04F 1/00 137/565.23 |
| 2014/0298884 | A1 * | 10/2014 | Mindlin | G01L 9/0047 73/1.63 |
| 2015/0323409 | A1 * | 11/2015 | Jiang | F04B 19/006 73/1.63 |
| 2016/0061684 | A1 * | 3/2016 | Gehm | G01L 27/005 701/36 |
| 2016/0281460 | A1 * | 9/2016 | Wang | E21B 47/06 |
| 2018/0017460 | A1 * | 1/2018 | Batista | G01L 27/005 |
| 2018/0094997 | A1 * | 4/2018 | Hunt | G01L 27/002 |
| 2019/0120713 | A1 * | 4/2019 | Sgourakes | G01L 19/06 |
| 2019/0234824 | A1 * | 8/2019 | Platte | G01L 27/005 |
| 2019/0277720 | A1 * | 9/2019 | Neumaier | G01L 27/005 |

OTHER PUBLICATIONS

International Search Report PCT/ISA/210 for International Application No. PCTGB2016/053508 dated Mar. 23, 2017.
Written Opinion of the International Searching Authority PCT/ISA/237 for International Application No. PCT/GB2016/053508 dated Mar. 23, 2017.

* cited by examiner

IN-SITU PRESSURE SENSOR BIAS DETERMINATION APPARATUS, SUBSEA SENSOR NODE APPARATUS AND METHOD OF DETERMINING A BIAS OF A PRESSURE SENSING APPARATUS

The present invention relates to an in-situ pressure sensor bias determination apparatus of the type that, for example, determines a bias of a measurement pressure sensor. The present invention also relates to a sensor node apparatus of the type that, for example, is siteable in a subsea environment and comprises a measurement pressure sensor and determines a bias thereof. The present invention further relates to a method of measuring a bias of a pressure sensing apparatus, the method being of the type that, for example, measures a pressure sensor bias using a reference pressure sensor.

In a subsea environment, a number of applications exist for the measurement of relative depths in respect of nearby locations, for example for levelling of platforms, monitoring of sea floor subsidence, and the monitoring of vertical changes in the sea floor during magma flow, geological fault activity and tectonic plate movements.

In the field of marine survey operations, for example for oil and gas extraction at sea, it is known to monitor seabed settlement to assess seafloor deformation and subsidence as reservoirs are depleted. By measuring repeatedly the depth of the sea floor several times over a number of years, changes to the structure of a reservoir containing hydrocarbons can be observed and deformation of the reservoir as a result of hydrocarbon extraction can be identified. Such surveys are currently performed by deploying a large array of subsea sensor logging nodes on the seabed that operate autonomously.

In an example of a known deployment, the sensor nodes are placed on the seabed by Remote Operated Vehicles (ROVs) operated from a surface vessel, usually in the order of 100 nodes at any one time. Typically, the sensor nodes are placed in two-dimensional arrays or "patches". Once an array of sensor nodes has been deployed, each node individually monitors depth by way of the respective pressure sensor. In this respect, it is known for such pressure sensors to comprise quartz resonant pressure sensors, though sensors of a different technology are often used in tandem in order to separate the pressure measurement from the background noise.

However, pressure sensors of the quartz resonant type are known to suffer from drift resulting from quartz crystal aging, sometimes referred to as "outgassing", whereby the mass of a resonator of the sensor decreases with time. Another cause is so-called attachment joint "creep" in the sensor. Sensors of other technology types suffer from similar problems. A hydrocarbon reservoir typically subsides at a rate of 1 to 2 cm per year, whereas drift of depth measurements made using the best quality pressure sensors is at a rate of 1 to 10 cm per year, which can be misinterpreted as a real change in seafloor height. Consequently, it can be seen that there is a need to compensate regularly for drift in measurements made by the pressure sensor in order to ensure accurate depth measurement and hence reservoir deformation measurement.

In-situ pressure sensor calibrations require a stable or easily measured reference. In this respect, "A Self-Calibrating Pressure Recorder for Detecting Seafloor Height Change" (Sasagawa et al., IEEE Journal of Oceanic Engineering, 2013/07, Vol. 38, pages 447 to 454) proposes a pair of quartz pressure gauges recording ambient seawater pressure that are periodically connected to a piston gauge calibrator. The piston gauge calibrator is based upon a dead weight pressure principle of operation. However, the apparatus described in this document is mechanically complex and has a limited lifespan. Furthermore, the apparatus is not reliable in its operation and has to be specifically designed for the depth of seawater in which it is to be deployed.

Another in-situ seafloor pressure calibration technique has been developed by the National Metrology Institute of Japan-(AIST) and is described in the Technical Notes (Doc. Nos. G8097 Rev. B and G8099 Rev. NC) published by Paroscientific, Inc. The so-called "A-0-A" technique comprises venting from ocean pressure (A) to ambient pressure (0) within a housing of a measurement system. In this respect, a switching valve internal to an Ocean Bottom Seismometer (OBS), a Pressure Inverted Echo Sounder (PIES), or a casing line that delivers ocean pressures to a quartz pressure sensor is periodically closed to seawater pressure (A) and is, instead, vented to an internal 1 bar absolute pressure (0). Reference calibration points at the absolute internal pressure (0) are measured using a barometer disposed inside the housing of the measurement system and are used to compensate for the drift at ocean depths (A). The sensor biases calculated at the reference calibration points (0) are interpolated to adjust the ocean pressure readings (A).

However, the measurement system employs a fluid conduit filled with an oil, the oil being topped-up from a reservoir of oil. Each time the measurement system is vented to the internal atmosphere of the housing, a certain amount of oil and possibly seawater leaks into the housing over time. As will be appreciated, the ingress of oil, and particularly seawater, can result in deleterious effects upon highly accurate and sensitive apparatus within the node.

According to a first aspect of the present invention, there is provided an in-situ pressure sensor bias determination apparatus, the apparatus comprising: a measurement pressure sensor; a reference pressure sensor; an electronically controllable pressure adjustment device; and a fluid conduit network having an ambient access port; wherein the measurement pressure sensor has a greater operating pressure range than the reference pressure sensor; the measurement pressure sensor, the reference pressure sensor and the pressure adjustment device are sealingly coupled to the fluid conduit network so as to define a volume that is open only at the ambient access port; and an ambient isolation device arranged to isolate selectively ambient pressure from the measurement pressure sensor, the reference pressure sensor and the pressure adjustment device, thereby closing the open volume.

The fluid conduit network may comprise a manifold portion serving the measurement pressure sensor and the reference pressure sensor.

The manifold portion may extend between the ambient access port and the pressure adjustment device.

The fluid conduit network may comprise a measurement spur portion; the manifold portion of the fluid conduit network may be in fluid communication with the measurement pressure sensor via the measurement spur portion.

The fluid conduit network may comprise a calibration spur portion; the manifold portion of the fluid conduit network may be capable of being in fluid communication with the reference pressure sensor via the calibration spur portion.

The apparatus may further comprise: a reference sensor isolation device arranged to isolate selectively the reference pressure sensor from the measurement pressure sensor and the pressure adjustment device.

The reference sensor isolation device may be disposed between the reference pressure sensor and the manifold portion of the fluid conduit network. The calibration isolation device may be a first valve. The first valve may be electrically controllable.

The ambient isolation device may be disposed in the fluid conduit network. The ambient isolation device may be a second valve. The second valve may be electrically controllable.

The apparatus may further comprise: a controller operably coupled to the reference sensor isolation device and the ambient isolation device.

The apparatus may further comprise: a controller operably coupled to the measurement pressure sensor, the reference pressure sensor and the pressure adjustment device.

The controller may comprise operating sequence logic arranged to isolate the ambient access port from the fluid conduit network prior to allowing fluid communication between the reference pressure sensor and the pressure adjustment device.

The operating sequence logic may be arranged to actuate the pressure adjustment device after isolation of the ambient access port from the fluid conduit network and prior to allowing fluid communication between the reference pressure sensor and the pressure adjustment device.

The pressure adjustment device may be arranged to lower selectively a pressure in the fluid conduit network to a pressure within the operating pressure range of the reference pressure sensor.

The pressure adjustment device may be arranged to lower the pressure monotonically and in a consistent manner.

The pressure adjustment device may be arranged to lower the pressure over a predetermined period of time, for example over a period of about 5 minutes. The pressure adjustment device may be arranged to lower the pressure in a manner consistent with substantially each previous lowering of the pressure.

The controller may be arranged to allow fluid communication between the reference pressure sensor and the pressure adjustment device after the pressure adjustment device has lowered the pressure in the fluid conduit network.

The controller may be arranged obtain a first pressure measurement from the measurement pressure sensor and a second pressure measurement from the reference pressure sensor.

The controller may be arranged to use the first and second pressure measurements to determine a pressure measurement bias value in respect of the measurement pressure sensor.

The apparatus may further comprise: a motor control unit operably coupled to the pressure adjustment device, the motor control unit being operably coupled to the controller.

The pressure adjustment device may be a pump device. The pump device may be a screw pump.

The measurement pressure sensor and the reference pressure sensor may employ different pressure sensing technologies.

The measurement pressure sensor and the reference pressure sensor may both be resonant pressure sensors.

The measurement pressure sensor may be a quartz resonant sensor.

The reference pressure sensor may be a silicon resonant sensor.

According to a second aspect of the present invention, there is provided a subsea sensor node apparatus comprising: a housing; and an in-situ pressure sensor bias determination apparatus as set forth above in relation to the first aspect of the invention; wherein the in-situ pressure sensor is disposed within the housing.

The housing may be pressure-resistant.

The ambient access port may be disposed between an interior chamber of the housing and an ambient environment external to the housing.

According to a third aspect of the present invention, there is provided a method of determining a bias of a pressure sensing apparatus, the method comprising: providing a fluid conduit network having an ambient isolation device; providing a reference pressure sensor sealingly coupled to the fluid conduit network, the reference pressure sensor being selectively fluidly coupleable to the fluid conduit network; providing a measurement pressure sensor sealingly coupled to the fluid conduit network; providing an electronically controllable pressure adjustment device sealingly coupled to the fluid conduit network; isolating selectively ambient pressure from the measurement pressure sensor, the reference pressure sensor and the pressure adjustment device, thereby closing an open volume, the open volume being defined by the measurement pressure sensor, the reference pressure sensor and the pressure adjustment device sealingly coupled to the fluid conduit network and open only at the ambient access port prior to closing; actuating the pressure adjustment device to reduce a pressure within the closed volume; connecting the reference pressure sensor to the fluid conduit network; and measuring a bias of the measurement pressure sensor; wherein the measurement pressure sensor has a greater operating pressure range than the reference pressure sensor.

It is thus possible to provide an apparatus and method capable of determining a bias pressure value associated with the measurement pressure sensor. The apparatus and method obviates fouling of an interior chamber of a housing of the apparatus with oil and/or seawater, thereby protecting sensitive electronic and electromechanical hardware from exposure to such fluids. Corrosion and/or failure of the hardware contained within the housing is therefore obviated or at least mitigated, resulting in the apparatus having an increased operational lifespan. Advantageously, it is only necessary to use one measurement of pressure in the range of operation of the reference pressure sensor, as opposed to at least two measurements, in order to determine the bias of the measurement pressure sensor. Furthermore, the apparatus and method enables the bias of the measurement reference sensor to be reduced to the bias of the reference pressure sensor, thereby imparting the ability to measure depth within a range of accuracy of the reference pressure sensor, but at depths far greater than can be measured using the reference pressure sensor.

At least one embodiment of the invention will now be described, by way of example only, with reference to the accompanying drawings, in which.

Throughout the following description identical reference numerals will be used to identify like parts.

Figure 1:
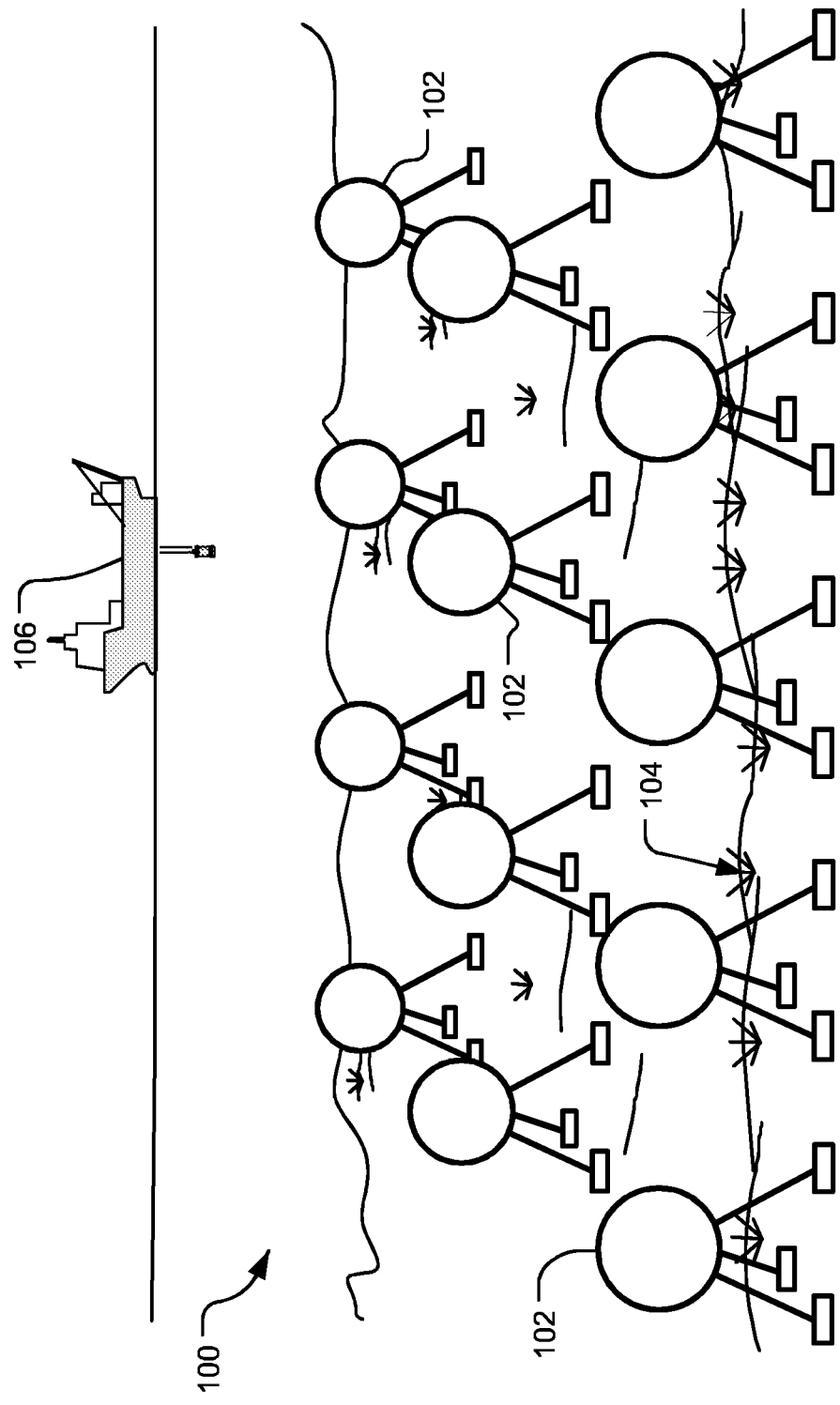
FIG. 1 is a schematic diagram of a deployment of a plurality of subsea sensor node apparatuses.

Referring to FIG. 1, a seafloor depth monitoring system 100 comprises a plurality of sensor node apparatuses 102 disposed on a seabed 104. In this example, each of the plurality of sensor nodes 102 is a seafloor monitoring node, for example a Fetch™ node available from Sonardyne International Limited, UK, adapted as described later herein. The plurality of sensor nodes 102 comprises a bidirectional communications module (not shown in FIG. 1) available from Sonardyne International Limited, UK, details of which will be described later herein. A surface vessel 106 is deployed and capable of communicating with the plurality of sensor nodes 102, for example to procure measurement data from each of the plurality of sensor node apparatus 102.

In this example, the plurality of sensor nodes 102 is disposed in an array formation and in a spaced manner. In this example, the plurality of sensor nodes 102 is distributed as an array measuring about 12 km×12 km.

Figure 2:
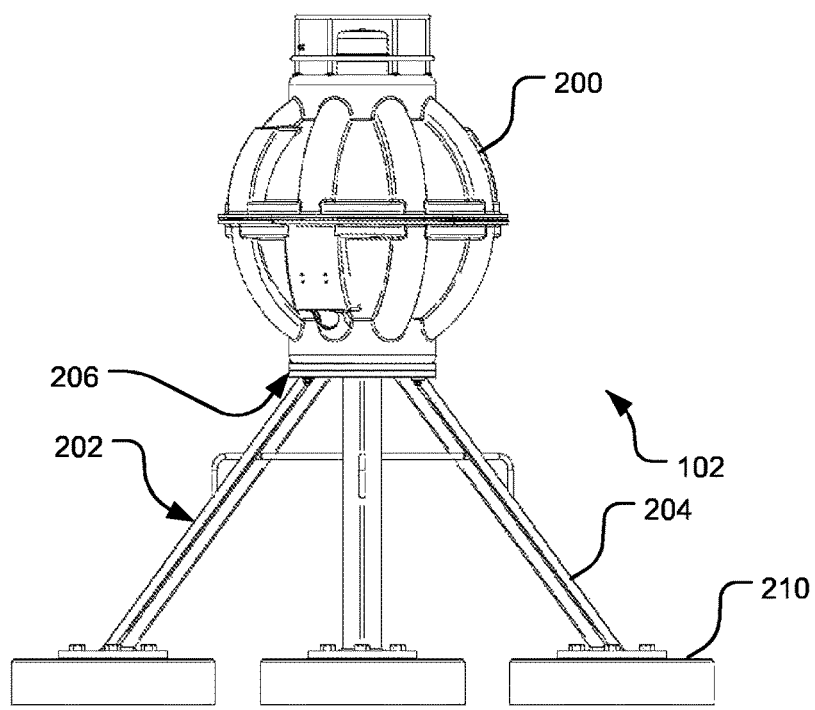
FIG. 2 is a schematic diagram of a sensor node apparatus of FIG. 1, but in greater detail.

Turning to FIG. 2, a sensor node apparatus 102 comprises a pressure case 200 having an aperture (not shown in FIG. 2) for access to ambient seawater when the sensor node apparatus 102 is immersed in water, for example when submerged in the sea, such as when disposed on the seabed 104. The pressure case 200 constitutes a housing and defines an interior chamber. In this example, the housing 200 is seated on a tripod frame structure 202 having legs 204 extending away from a platform 206 to which the housing 200 is secured. A foot 210 is provided at the end of each leg 204. The tripod frame 202 serves to support the housing 200 in a fixed position relative to the seabed 104 and to prevent the housing 200 from changing position when deployed.

Figure 3:
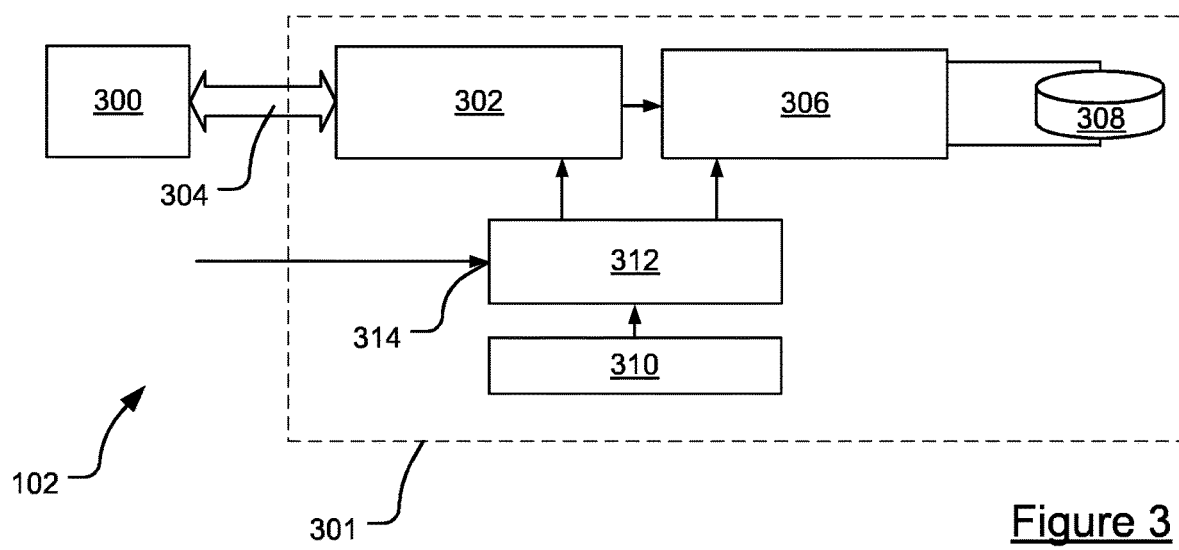
FIG. 3 is a schematic diagram of a sensor module and an electronic hardware subsystem employed by the sensor node apparatus of FIG. 2.

Referring to FIG. 3, each of the plurality of sensor nodes 102 comprises a sensor module 300 and an electronic subsystem 301 contained within the housing 200. The sensor module 300 is operably coupled to a processing resource, for example a controller 302 having, in this example an operating sequence logic for controlling the sensor module 300 in a predetermined manner that will be described later herein in further detail. The sensor module 300 is, in this example, a pressure sensor module for measuring the depth of the seabed 104 beneath the sensor node 102. The sensor module 300 is capable of communicating with the controller 302 via a Universal Serial Bus (USB) or an RS-232 communications interface 304. The electronic subsystem 301 comprises the controller 302, which is also operably coupled to a transceiver circuit 306 of the electronic subsystem 301 to implement bidirectional communications between the sensor node 102 and the surface vessel 106. The transceiver circuit 306 is operably coupled to an acoustic transceiver 308 of the electronic subsystem 301. The transceiver circuit 306 and the acoustic transducer 308 are, in this example, a suitably adapted Nano Responder unit available from Sonardyne International Limited, UK.

In order to power the sensor module 300, the controller 302 and the transceiver circuit 306, the electronic subsystem 301 comprises a battery 310, the battery 310 being operably coupled to a power supply circuit 312 of the electronic subsystem 301, the power supply circuit 312 having a power control input 314. The power supply circuit 312 is operably coupled to the controller 302 and the transceiver circuit 306. Although not shown in FIG. 3, the power supply circuit 312 is also operably coupled to the sensor module 300. The power control input 314 can be used by the sensor module 300 selectively to power up the transceiver circuit 306 only when data communications is required, thereby conserving the life of the battery 310.

Figure 4:
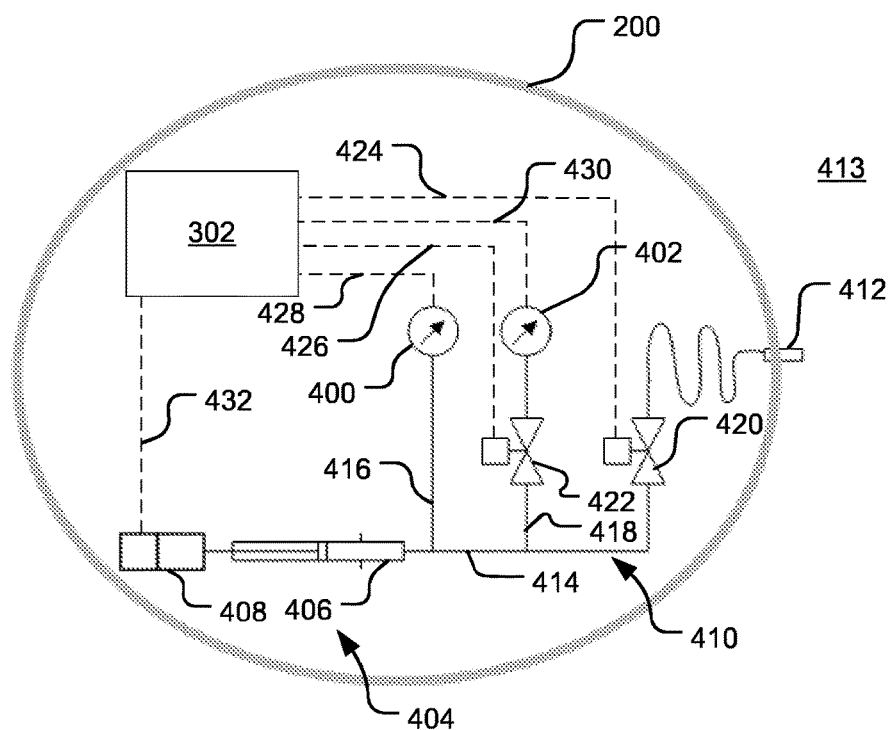
FIG. 4 is a schematic diagram of a pressure sensor bias determination apparatus employed in the subsea nodes of FIGS. 1 and 2, and constituting an embodiment of the invention.
Figure 5:
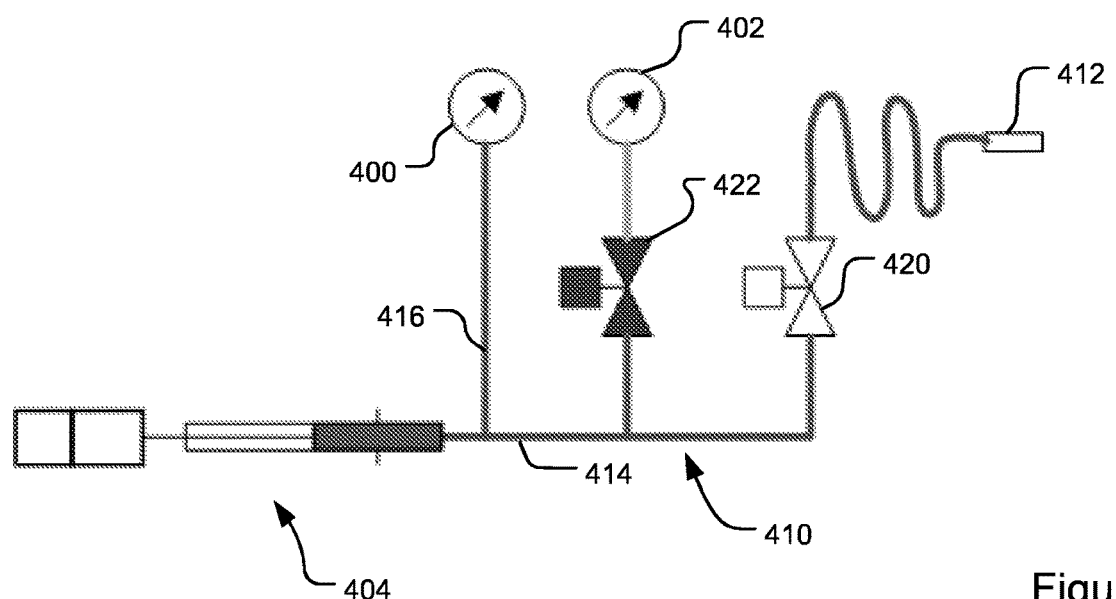
FIG. 5 is a schematic diagram of the apparatus of FIG. 4 in a measurement state.

Referring to FIG. 4, the sensor module 300 comprises a measurement pressure sensor 400, a reference pressure sensor 402 and an electronically controllable pressure adjustment or control device 404 disposed therein. The reference pressure sensor 402 constitutes pressure sensor capable of measuring a pressure that can be used as a point of reference to determine offset of the measurement pressure sensor 400. The measurement pressure sensor 400 has an operating pressure range that is considerably larger than an operating pressure range of the reference pressure sensor 402. The measurement pressure sensor 400 is, in this example, a quartz resonant type of pressure sensor, such as a 43K Digiquartz sensor available from Paroscientific, Inc. The reference pressure sensor is, in this example, a silicon resonant type of pressure sensor, such as a Trench Etched Resonant Pressure Sensor (TERPS) available from GE Measurement and Control Solutions (Druck). As can be seen, the measurement pressure sensor 400 and the reference pressure sensor 402 respectively employ different types of pressure sensing technologies, but in this example both are resonant pressure sensors, chosen to provide a high level of precision. In the case of the reference pressure sensor 402, the reference pressure sensor selected is intended to provide as good stability as possible, for example no or little change in bias over time.

In this example, the pressure adjustment device 404 is a pump device, the pump device comprising a screw pump 406 operably coupled to a drive and gearbox unit 408, constituting a motor control unit. However, although the pressure adjustment device 404 implemented as described herein comprises the combination of the screw pump 406 and the drive and gearbox unit 408, the skilled person will appreciate that other techniques can be employed to adjust or control pressure, for example a heating and cooling system that adjusts pressure by way of thermal expansion and contraction.

The sensor module 300 comprises a fluid conduit network 410 formed from, for example, a manifold portion 414 having a first end sealingly coupled to the screw pump 406, a second end of the manifold 414 being sealingly coupled to an ambient access port 412 disposed between the interior chamber of the housing 200 and an ambient environment external to the housing 200, for example the ambient seawater when deployed. The ambient access port 412 provides access to the ambient seawater 413 mentioned above. The fluid conduit network 410 has a measurement spur portion 416 fluidly connected at a first end thereof to or integrally formed with the manifold 414, a second end of the measurement spur portion 416 being sealingly connected to the measurement pressure sensor 400. In this respect, the manifold 414 is in fluid communication with the measurement pressure sensor 400 via the measurement spur portion 416. The fluid conduit network 410 also comprises a calibration spur portion 418 having a first end thereof sealingly connected to or integrally formed with the manifold 414 and a second end sealingly coupled to the reference pressure sensor 402. In this respect, the manifold 414 is capable of being in fluid communication with the reference pressure sensor 402 via the calibration spur portion 418.

An ambient access isolation device 420, for example a valve, is disposed between the second end of the manifold 414 and the ambient access port 412 in order to create a closed pressure measurement system comprising the pressure adjustment device 404, the measurement pressure sensor 400, the reference pressure sensor 402 and at least part of the fluid conduit network 410, for example at least part of the manifold 414, to permit fluid communication between the pressure adjustment device 404, the measurement pressure sensor 400 and the reference pressure sensor 402. The measurement pressure sensor 400, the reference pressure sensor 402, and the pressure adjustment device 404 are thus coupled to the fluid conduit network 410 so as to define a volume that is open only at the ambient access port 412, unless closed by the ambient access isolation valve 420. In this example, the manifold 414 can therefore be selectively isolated from the ambient access port 412 and hence ambient seawater 413 during deployment of the sensor node 102. A calibration isolation device 422, for example a valve, is disposed so as to isolate selectively the reference pressure sensor 402 from the ambient access port 412 when the volume mentioned above is open. In this example, the reference sensor isolation valve 422 is disposed in-line in the calibration branch portion 418 of the fluid conduit network 410. However, the skilled person should appreciate that, if desired, the reference sensor isolation valve 422 can be disposed at the opposite end of the fluid calibration branch portion 418 to the manifold 414 and connected to the reference pressure sensor 402 or integrally formed with the reference pressure sensor 402.

In this example, the controller 302 is operably coupled to the ambient access isolation device 420 by an ambient access control line 424. Similarly, the controller 302 is operably coupled to the calibration isolation device 422 by a calibration sensor access control line 426. The controller 302 is also operably coupled to the measurement pressure sensor 400 by a measurement pressure line 428 and to the reference pressure sensor 402 by a calibration pressure line 430. The controller 302 is also operably coupled to the drive and gearbox unit 408 by a pressure control line 432.

Although not shown, the manifold 414 is filled with working fluid, for example a hydraulic fluid, such as any suitable oil.

In operation (FIGS. 5 to 8), the sensor node apparatus 102 comprises a measurement mode and a bias determination mode. Assuming the sensor node apparatus has been deployed and is immersed in seawater, the sensor node apparatus 102 is typically in the measurement mode. In the measurement mode, the ambient access isolation valve 420 is open allowing the ambient seawater access to the manifold 414 via the ambient access port 412. In the measurement mode, the calibration isolation valve 422 is closed in order to prevent fluid in the manifold 414 accessing the reference pressure sensor 402, because as mentioned above, the operating pressure range of the reference pressure sensor 402 is significantly shorter than the operating pressure range of the measurement pressure sensor 400 and so the reference pressure sensor 402 is likely to be damaged by exposure to the pressure exerted by the ambient seawater.

As a result of the above connection configuration in respect of the measurement mode, the ambient seawater applies pressure to the oil in the manifold 414, which is, in turn, applied to the pressure adjustment device 404 and the measurement pressure sensor 400 via the measurement branch 416 of the manifold 414. The pressure of the ambient seawater can therefore be measured by the measurement pressure sensor 400, which is read by the controller 302 via the measurement pressure line 428.

Figure 6:
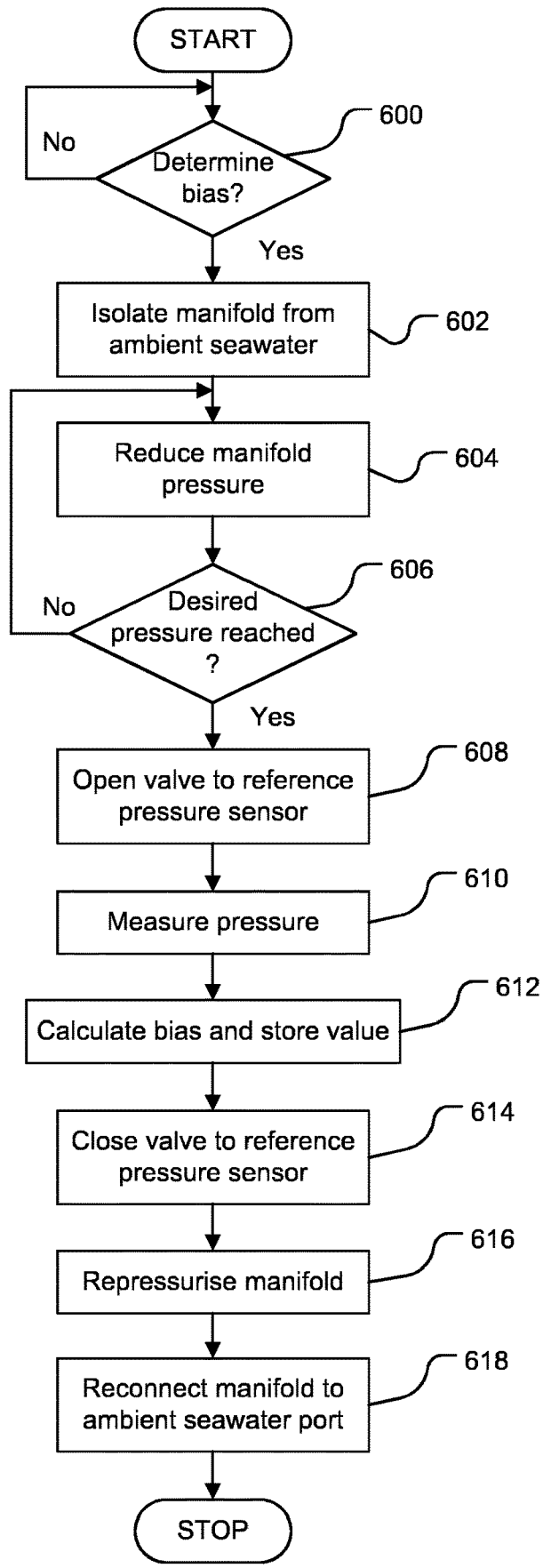
FIG. 6 is a flow diagram of a method of determining a bias of a pressure sensor employed by the pressure bias determination apparatus of FIG. 4 and constituting another embodiment of the invention.
Figure 7:
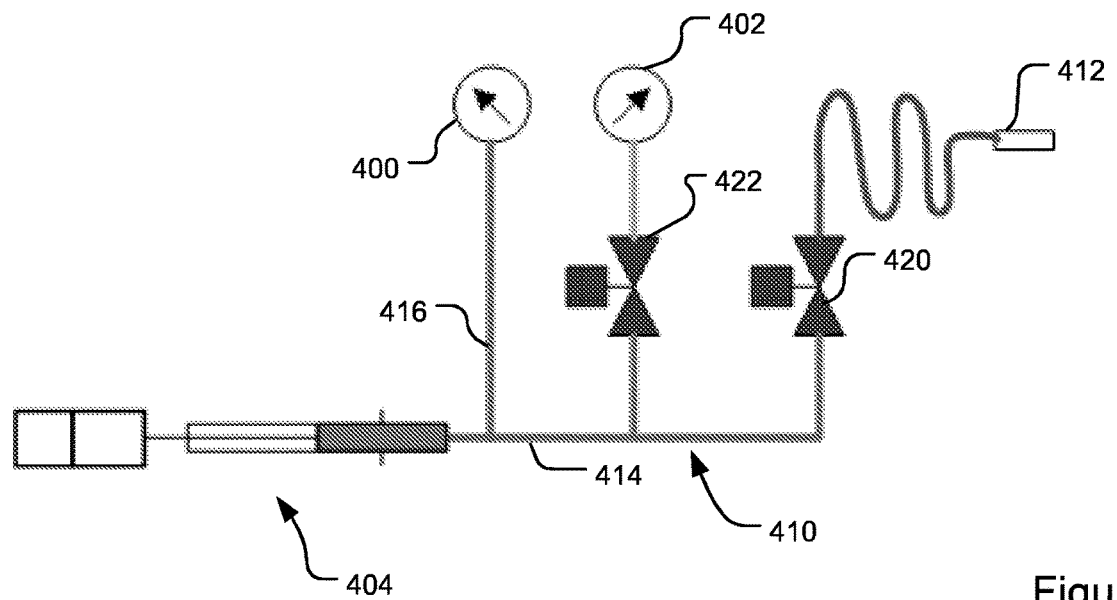
FIG. 7 is a schematic diagram of the apparatus of FIG. 4 when isolated from ambient.
Figure 8:
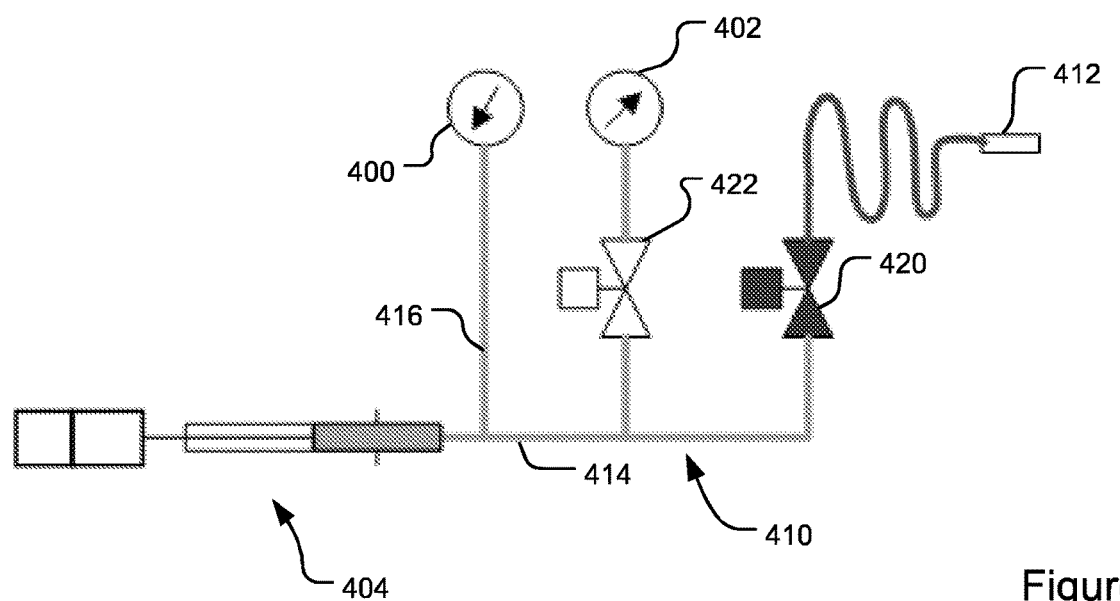
FIG. 8 is a schematic diagram of the apparatus of FIG. 3 in a bias determination state.

The measurement mode is implemented periodically in order to measure the pressure of the ambient seawater, for example as part of a monitoring programme. The frequency of measurement of the pressure of the ambient seawater is dependent upon the application for which the sensor node apparatus 102 has been chosen. However, due to the bias that the measurement pressure sensor 400 develops over time, it is desirable to determine the bias associated with the measurements made. In this regard, prior to, or in this example, following measurement of the pressure of the ambient seawater, the controller 302 determines that it is necessary to enter the bias determination mode (FIG. 6, Step 600). In the bias determination mode, the controller 302 actuates (Step 602) the ambient access isolation valve 420, resulting in both valves 420, 422 being closed and the measurement pressure sensor 400 only being exposed to the pressure in the manifold 414 (FIG. 7). The controller 302 then activates the drive and gearbox unit 408 in order to cause the screw pump 406 to translate a piston in a cylinder thereof in order to reduce selectively the pressure in the manifold 414. In this respect, the pressure in the manifold 414 is reduced gradually, for example over a period of 5 minutes, in order to avoid the measurement pressure sensor 400 being exposed to a rapid change in pressure, which could induce an indeterminate change in the pressure sensor and a consequential introduction of measurement errors. Time is also required to allow for adiabatic temperature changes in the fluid to reach an equilibrium with the temperature of the sensor and surroundings. As such, in this example, the reduction in pressure is a monotonic and/or continuous function with a gradient at any given point that is below a predetermined gradient selected to avoid the above-mentioned undesirable effects. The controller 302 reduces (Step 604) the pressure in the manifold 414 to a pressure that is within the operating pressure ranges of both the reference pressure sensor 402 and the measurement pressure sensor 400, for example up to about 70 MPa in the manifold 414 is reduced to up to about 250 kPa, such as 100 kPa, for the reference sensor to safely measure (it being assumed that both the higher and lower ranges of pressures are greater than 0 Pa. For example, a pressure between about 30 MPa and about 40 MPa or between about 20 MPa and about 30 MPa can be reduced to a pressure up to about 250 kPa, such as 100 kPa. In one example, a pressure of about 30 MPa can be reduced to about 100 kPa. In this respect, in addition to monitoring the measurement pressure sensor 400 in order to monitor the reduction in pressure in the manifold 414, the controller 302 monitors the reference pressure sensor 402 in order to ensure that the reduction in the pressure in the manifold 414 reaches a pressure that is as close as practicable to a current pressure reading of the reference pressure sensor 402, for example about the same reading as the reference pressure sensor 402, which can be about 100 kPa. In this example, the full scale of the reference pressure sensor 402 is about 250 kPa.

The controller 302 therefore monitors the pressure sensed by the measurement pressure sensor 400 with reference to the reading of the reference pressure sensor 402 in order to determine (Step 606) when a desired pressure is attained. As will be appreciated by the skilled person, a closed loop control technique is applied in order to reduce the pressure of the fluid in the manifold 414 to a desired pressure. Thereafter, when the pressure in the manifold 414 has reached a pressure that is within the operating pressure range of the reference pressure sensor 402, and as close as practicable to the current reading of the reference pressure sensor 402, the controller 302 actuates (Step 608), via the reference sensor access control line 426, the reference sensor isolation valve 422 in order to bring the reference pressure sensor 402 gradually into fluid communication with the manifold 414 (FIG. 8), thereby enabling the reference pressure sensor 402 to measure the pressure of the fluid in the manifold 414.

The controller 302 uses both the measurement pressure sensor 400 and the reference pressure sensor 402 to measure (Step 610) the pressure of the fluid in the manifold 414. Thereafter, the controller 302 determines (Step 612) a pressure bias value from the difference between the pressure measured by the measurement pressure sensor 400 and the pressure measured by the reference pressure sensor 402. The pressure bias value is then stored by the controller 302 along with the pressure of the ambient seawater measured.

The measurement pressure sensor 400 has a ±21 millibar error associated with the drift of the Paroscientific 43K Digiquartz sensor as compared with a ±0.25 millibar error of the reference pressure sensor 402 in respect of drift of the GE Druck TERPS sensor. Consequently, by determining the bias of the measurement pressure sensor 400 with respect to the reference pressure sensor 402, the accuracy of the measurement pressure sensor 400 is increased to the accuracy of the reference pressure sensor 402.

Once the bias pressure value has been determined, the controller 302 returns the sensor node apparatus 102 to the measurement mode by actuating the reference sensor isolation valve 422 so as to isolate (Step 614) the reference pressure sensor 402 from the manifold 414. The controller 302 then issues a command signal to the drive and gearbox unit 408, via the pressure control line 432, in order to actuate the pump unit 406 so as to translate the piston in the cylinder thereof and thus repressurise (Step 616) the fluid in the manifold 414. In this respect, for the same reason as the manifold 414 is depressurised slowly, i.e. over a period of time, the manifold 414 is pressurised over a period of about 5 minutes. Once the fluid in the manifold 414 has been pressurised to a sufficiently high pressure commensurate with the pressure of the ambient seawater, the controller 302 actuates (Step 618) the ambient access isolation valve 420 in order to reconnect the manifold 414 to the ambient access port 412. The sensor node apparatus 102 is then in the measurement state (FIG. 5) once again.

The skilled person should appreciate that the above-described implementations are merely examples of the various implementations that are conceivable within the scope of the appended claims. Indeed, the skilled person should appreciate that descriptions herein of the measurement pressure sensor 400 and the reference pressure sensor 402 being of the resonant type is just one example of combinations of sensor types and other combinations are contemplated, for example the measurement pressure sensor 400 can be of a different type to the reference pressure sensor 402, for example one can be quartz resonant pressure sensor and the other can be a piezoresistive pressure sensor. Likewise, although the above examples are described in conjunction with a Fetch seafloor monitoring node, the skilled person should appreciate that the sensor module 300 can be incorporated into other apparatus, for example an Autonomous Monitoring Transponder available from Sonardyne International Limited or any other suitable apparatus.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

The invention claimed is:

1. A subsea sensor node apparatus, comprising:
a housing; and
an in-situ pressure sensor bias determination apparatus disposed within the housing, the in-situ pressure sensor bias determination apparatus including
a measurement pressure sensor;
a reference pressure sensor;
an electronically controllable pressure adjustment device; and
a fluid conduit network having an ambient access port; wherein
the measurement pressure sensor has a greater operating pressure range than the reference pressure sensor;
the measurement pressure sensor, the reference pressure sensor and the pressure adjustment device are sealingly coupled to the fluid conduit network so as to define a volume that is open only at the ambient access port; and
an ambient isolation device arranged to isolate selectively ambient pressure from the measurement pressure sensor, the reference pressure sensor and the pressure adjustment device, thereby closing the open volume.

2. The apparatus according to claim 1, wherein the fluid conduit network comprises a manifold portion sealingly coupled to the measurement pressure sensor and the reference pressure sensor.

3. The apparatus according to claim 2, wherein the manifold portion extends between the ambient access port and the pressure adjustment device.

4. The apparatus according to claim 2, wherein the fluid conduit network comprises a measurement spur portion, the manifold portion of the fluid conduit network being in fluid communication with the measurement pressure sensor via the measurement spur portion.

5. The apparatus according to claim 2, wherein the fluid conduit network comprises a calibration spur portion, the manifold portion of the fluid conduit network being capable of being in fluid communication with the reference pressure sensor via the calibration spur portion.

6. The apparatus according to claim 1, further comprising:
a reference sensor isolation device arranged to isolate selectively the reference pressure sensor from the measurement pressure sensor and the pressure adjustment device.

7. The apparatus according to claim 6, further comprising:
a controller operably coupled to the reference sensor isolation device and the ambient isolation device.

8. The apparatus according to claim 7, wherein the controller comprises operating sequence logic arranged to isolate the ambient access port from the fluid conduit network prior to allowing fluid communication between the reference pressure sensor and the pressure adjustment device.

9. The apparatus according to claim 8, wherein the operating sequence logic is arranged to actuate the pressure adjustment device after isolation of the ambient access port from the fluid conduit network and prior to allowing fluid communication between the reference pressure sensor and the pressure adjustment device.

10. The apparatus according to claim 9, wherein the pressure adjustment device is arranged to lower selectively a pressure in the fluid conduit network to a pressure within the operating pressure range of the reference pressure sensor.

11. The apparatus according to claim 10, wherein the pressure adjustment device is arranged to lower the pressure monotonically and in a consistent manner.

12. The apparatus according to claim 10, wherein the controller is arranged to allow fluid communication between the reference pressure sensor and the pressure adjustment device after the pressure adjustment device has lowered the pressure in the fluid conduit network.

13. The apparatus according to claim 12, wherein the controller is arranged to obtain a first pressure measurement from the measurement pressure sensor and a second pressure measurement from the reference pressure sensor.

14. The apparatus according to claim 13, wherein the controller is arranged to use the first and second pressure measurements to determine a pressure measurement bias value in respect of the measurement pressure sensor.

15. The apparatus according to claim 1, further comprising:
a controller operably coupled to the measurement pressure sensor, the reference pressure sensor and the pressure adjustment device.

16. The apparatus according to claim 1, wherein the measurement pressure sensor and the reference pressure sensor employ different pressure sensing technologies.

17. The apparatus according to claim 1, wherein the measurement pressure sensor and the reference pressure sensor are both resonant pressure sensors.

18. The apparatus according to claim 1, wherein the ambient access port is disposed between an interior chamber of the housing and an ambient environment external to the housing.

19. A method of determining a bias of a pressure sensing apparatus housed in a subsea sensor node apparatus, the method comprising:
providing, in a housing of the subsea sensor node apparatus, a fluid conduit network having an ambient access port;
providing, in the housing of the subsea sensor node apparatus, a reference pressure sensor sealingly coupled to the fluid conduit network, the reference pressure sensor being selectively fluidly coupleable to the fluid conduit network;
providing, in the housing of the subsea sensor node apparatus, a measurement pressure sensor sealingly coupled to the fluid conduit network;
providing, in the housing of the subsea sensor node apparatus, an electronically controllable pressure adjustment device sealingly coupled to the fluid conduit network;
isolating selectively ambient pressure from the measurement pressure sensor, the reference pressure sensor and the pressure adjustment device, thereby closing an open volume, the open volume being defined by the measurement pressure sensor, the reference pressure sensor and the pressure adjustment device sealingly coupled to the fluid conduit network and open only at the ambient access port prior to closing;
actuating the pressure adjustment device to reduce a pressure within the closed volume;
selectively connecting the reference pressure sensor to the fluid conduit network; and
measuring a bias of the measurement pressure sensor; wherein
the measurement pressure sensor has a greater operating pressure range than the reference pressure sensor.

* * * * *